(12) United States Patent
Deneuve et al.

(10) Patent No.: US 11,480,110 B2
(45) Date of Patent: Oct. 25, 2022

(54) METHOD AND DEVICE FOR ESTIMATING AND USING A DEAD ZONE OF A TURBOMACHINE VALVE

(71) Applicant: SAFRAN AIRCRAFT ENGINES, Paris (FR)

(72) Inventors: Sébastien Jean Fernand Deneuve, Moissy-Cramayel (FR); Jérôme Pascal Laurent Patrick Tronche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/609,986

(22) PCT Filed: May 15, 2020

(86) PCT No.: PCT/EP2020/063583
§ 371 (c)(1),
(2) Date: Nov. 9, 2021

(87) PCT Pub. No.: WO2020/229651
PCT Pub. Date: Nov. 19, 2020

(65) Prior Publication Data
US 2022/0260023 A1    Aug. 18, 2022

(30) Foreign Application Priority Data

May 16, 2019  (FR) ...................................... 1905104

(51) Int. Cl.
*F02C 9/18* (2006.01)
*F02C 6/08* (2006.01)
(Continued)

(52) U.S. Cl.
CPC .............. *F02C 9/18* (2013.01); *F01D 17/105* (2013.01); *F02C 6/08* (2013.01); *F02K 3/075* (2013.01);
(Continued)

(58) Field of Classification Search
CPC .. F02C 9/18; F02C 6/08; F01D 17/105; F02K 3/075
See application file for complete search history.

(56) References Cited

U.S. PATENT DOCUMENTS 3,638,428 A * 2/1972 Shipley .................... F02K 3/075
                                                    415/149.1
4,715,779 A * 12/1987 Suciu .................... F01D 17/105
                                                    60/39.83
(Continued)

FOREIGN PATENT DOCUMENTS

EP    2 060 746 A1    5/2009
FR    2 982 904 A1    5/2013
(Continued)

OTHER PUBLICATIONS

International Search Report for PCT/EP2020/063583 dated Sep. 3, 2020 (PCT/ISA/210).
French Search Report for 1905104 dated Jan. 23, 2020.

*Primary Examiner* — Topaz L. Elliott
(74) *Attorney, Agent, or Firm* — Sughrue Mion, PLLC

(57) ABSTRACT

The invention relates to a method for estimating and using a dead zone at closing of a flap (P1) of a discharge valve (VBV1) of a turbomachine, in which the actual position of the actuator (V1) is measured for a setpoint signal for closing the flap (P1), a static angle is determined from the actual position, a closing dead zone is determined from the static angle, corresponding to the fact that the joint (J1) remains compressed and seals the closing of the orifice (O1), the dead zone is recorded and the signal (SC1) for controlling the actuator (V1) is generated by the computer as a function of the dead zone.

12 Claims, 11 Drawing Sheets

Figure 1:
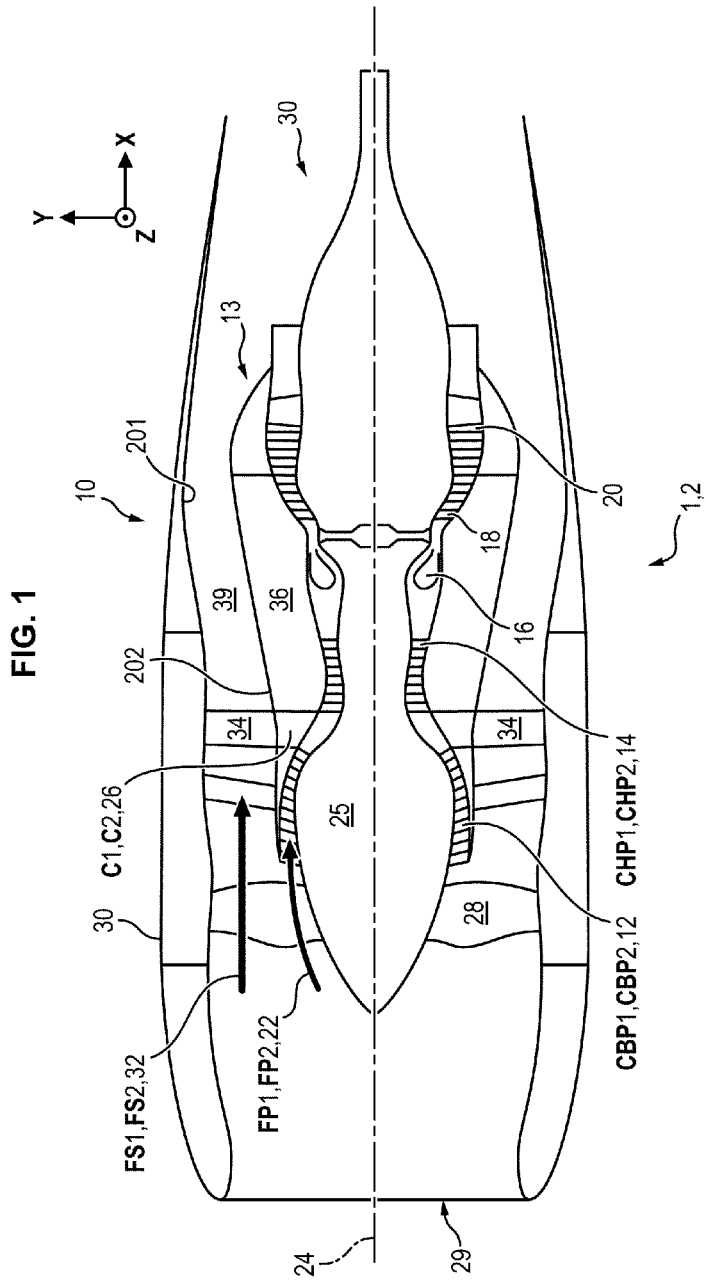

(51) Int. Cl.
  *F01D 17/10*    (2006.01)
  *F02K 3/075*    (2006.01)
(52) U.S. Cl.
  CPC ...... *F05D 2240/55* (2013.01); *F05D 2260/80* (2013.01); *F05D 2270/301* (2013.01); *F05D 2270/304* (2013.01)

(56) References Cited

U.S. PATENT DOCUMENTS

| | | | | |
|---|---|---|---|---|
| 4,827,713 | A * | 5/1989 | Peterson | F01D 17/105 415/150 |
| 5,048,286 | A * | 9/1991 | Stransky | F02K 3/075 60/226.3 |
| 9,482,160 | B2 * | 11/2016 | Sasaki | F02M 26/54 |
| 2007/0240677 | A1 | 10/2007 | Sasaki | |
| 2013/0263830 | A1 * | 10/2013 | Torii | F02M 26/54 123/568.11 |
| 2015/0139775 | A1 | 5/2015 | Kumar et al. | |
| 2018/0080337 | A1 * | 3/2018 | Bru | F02K 3/075 |
| 2019/0277200 | A1 * | 9/2019 | Mistry | F02C 6/08 |
| 2020/0232393 | A1 * | 7/2020 | Bulot | F02C 7/14 |
| 2022/0003168 | A1 * | 1/2022 | Tessiereau | F16J 15/02 |

FOREIGN PATENT DOCUMENTS

| | | | |
|---|---|---|---|
| FR | 3 022 606 | A1 | 12/2015 |
| FR | 3107086 | A1 * | 8/2021 |

* cited by examiner

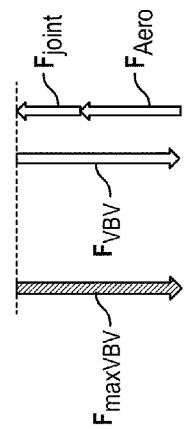
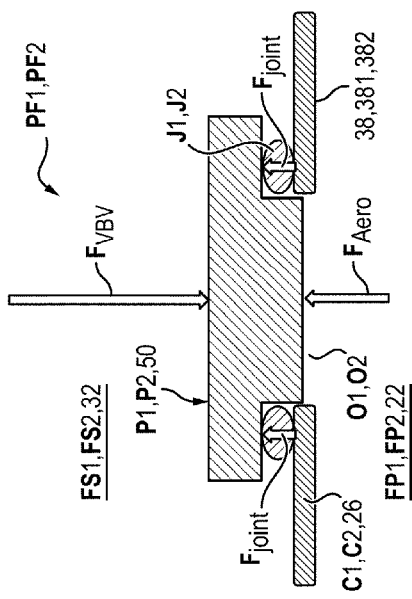

METHOD AND DEVICE FOR ESTIMATING AND USING A DEAD ZONE OF A TURBOMACHINE VALVE

The invention relates to a method and a device for estimating a closing dead zone of a turbomachine discharge valve.

One field of application relates to aircraft turbomachines, such as for example aircraft turbojets.

Document US2007/240677 describes a method for controlling a flap valve for gas recirculation, in which a dead band is taken into account.

Discharge valves (VBV for "variable bleed valve") allow discharging a portion of the primary flow into the secondary flow.

The invention applies in particular to discharge valves each comprising a gate actuated in pivoting on a hinge by an actuator, to open and close an orifice provided on a wall of a casing which delimits in part an outer wall of a stream of primary flow of the turbomachine. The gates are generally installed on an inner shroud of a structural casing of the turbomachine, which can for example be an intermediate casing which can in particular constitute a load path for the suspension of the turbomachine from a structure of an aircraft such as a pylon. The inner shroud of the structural casing has a wall which faces, on the inside, the stream of the primary flow. The opening of the gates allows discharging a portion of the flow rate of the primary flow to a stream of the secondary flow of the turbomachine, while passing through an inter-stream compartment which separates the stream of the primary flow from the stream of the secondary flow. Each gate is equipped with a gasket, which is compressed against the orifice so that the latter can be closed with a good seal.

There exists however an angular movement range of the gate, called the closing dead zone, during which the gasket remains compressed during the opening of the gate and therefore does not let the primary flow pass into the secondary flow. In other words, as long as the position of the gate remains in the dead zone range, the gate remains sealed even though it is not completely closed.

Control of the gate during the operation of the turbomachine in flight is usually accomplished by taking a fixed value of the dead zone as a base.

However, the fact of using the same fixed predetermined dead zone value for sets of discharge valves on different turbomachines leads, due to deviations in manufacturing, to having a gap between this fixed value and the actual value of each dead zone. This gap is manifested by excess opening or excess closing of each gate.

An underestimated fixed dead zone causes excess closing of the gate, which can cause surging of the engine due to a too low discharge.

On the contrary, an overestimated fixed dead zone causes excess opening of the gate and can cause an increase in the operating line of the fan and thus surging of the fan in certain cases, as well as an increase in temperature in the turbines causing a degradation of the engine or an impact on its performance.

It is desired to estimate what the actual dead zone is on each turbomachine.

The invention seeks to obtain a method and a device for estimating the dead zone, which allows solving these problems of excess opening and excess closing of the gate in flight.

To this end, a first subject matter of the invention is an estimation and use method for controlling a first actuator, of a closing dead zone of a first gate of a first discharge valve mounted on a first casing of a turbomachine to be investigated, the first casing delimiting in its inside a primary gas flow of the turbomachine, the first gate being designed to be able to be moved angularly by the first actuator depending on a first control signal of the first actuator between one and the other of:
  a first opening position of a first orifice of the first casing for discharging through this first orifice a portion of the first primary flow into a first secondary gas flow located outside the first casing,
  and a first closing position of the first orifice configured to prevent the primary flow from passing through the first orifice,
  the first gate being provided with a first gas seal gasket, able to be compressed against a first edge of the first orifice in the first closing position to seal the closure of the first orifice,
  characterized in that
  for the turbomachine to be investigated operating in flight, the first actual position of the first actuator is measured when the first control signal is equal to a first set point closing signal of the first gate,
  based on the first actual position, a measured droop angle of the first gate with respect to the first casing is determined,
  for the turbomachine to be investigated operating in flight, from the measured droop angle, a measured closing dead zone of the first gate is calculated by the calculator, in which the first gasket remains compressed and thus seals the closure of the first orifice,
  the measured closing dead zone is recorded in a permanent memory of a control calculator of the turbomachine to be investigated,
  the first control signal of the first actuator is generated by the calculator depending on the measured closing dead zone recorded in the memory.

Thanks to the invention, the actual dead zone in operation of the first gate of the turbomachine to be investigated is identified to control its angular position. Due to the fact that the control signal of the actuator for actuating the first gate takes into account that this actual dead zone has been estimated and recorded, its excess opening and excess closing during operation in flight of the turbomachine to be investigated is avoided.

According to one embodiment of the invention, for the turbomachine to be investigated operating in flight, a measured closing dead zone of the first gate, in which the first gasket remains compressed and thus seals the closure of the first orifice, is calculated based on the measured droop angle.

According to one embodiment of the invention, the first actuator comprises a first actuator body fixed with respect to the first casing and a first shaft movable in translation with respect to the first actuator body between a first long abutment, which corresponds to a maximum output travel of the first shaft out of the first body and a first short abutment, which corresponds to a minimum output travel of the first shaft out of the first body,
  at least one first connection member being mounted between the first shaft and the first gate to move angularly the first gate by movement in translation of the first shaft with respect to the first actuator body,
  the first closing position corresponding to a first intermediate output travel of the first shaft located below the first long abutment and beyond the first short abutment.

According to one embodiment of the invention, the first intermediate travel of the first shaft is adjusted prior to the measurement of the first actual position of the first actuator.

According to one embodiment of the invention, the control signal corresponds to a set point length of the first shaft, which is taken with respect to the first actuator body, which is oriented from the first short abutment to the first long abutment and which grows in a first opening direction of the first gate, the set point length is calculated by the calculator so as to add the measured closing dead zone to the first angle of the first gate with respect to the first casing.

According to one embodiment of the invention, the measured closing dead zone is calculated by the calculator as being equal to a reference dead zone, which was predetermined during operation on a reference turbomachine which can operate in flight and on the ground, to which has been added the measured droop angle and from which has been subtracted a reference droop angle which was predetermined on the reference turbomachine operating in flight to propel an aircraft.

According to one embodiment of the invention, which can be applied to the estimation and use method and/or to the estimation and use device, the reference turbomachine has a second gate of a second discharge valve mounted on a second casing of the reference turbomachine, the second casing delimiting in its inside a primary gas flow of the reference turbomachine, the second gate being designed to be able to be moved angularly by a second actuator depending on a second control signal of the second actuator between one and the other of:
- a second opening position of a second orifice of the second casing to discharge through this second orifice a portion of the second primary flow into a second secondary gas flow of the reference turbomachine located outside the second casing,
- and a second closing position of the second orifice to prevent the primary flow from passing through the second orifice, the second gate being provided with a second gas seal gasket, able to be compressed against a second edge of the second orifice in the second closing position to seal the closure of the second orifice.

According to one embodiment of the invention, for the second turbomachine operating on the ground, the reference dead zone is determined, which is a second closing angular range of the second gate, during which, between the second closing position and the second opening position, the second gasket remains compressed and thus seals the closure of the second orifice.

According to one embodiment of the invention, for the turbomachine to be investigated operating in flight, a first rotation speed of a first high-pressure compressor of the turbomachine to be investigated, and measured operating parameters comprising at least one quantity selected from among a first atmospheric pressure and a first altitude, are determined, based on a model of the reference turbomachine giving a second gate angle of the reference turbomachine with respect to the second casing of the reference turbomachine, depending on a second rotation speed of the second high-pressure compressor of the reference turbomachine and on a second atmospheric pressure of the reference turbomachine or on a second operating altitude of the reference turbomachine, the reference droop angle is determined, which is the second gate angle of the reference turbomachine which corresponds according to the model to the measured operating parameters, the second gate angle corresponding to an angle of the second gate with respect to the second casing, which has been determined based on a second actual position of the second actuator, having itself been measured for the reference turbomachine operating in flight, when the second control signal is equal to a second set point closing signal of the second gate.

A second subject matter of the invention is an estimation and use device for controlling a first actuator, of a closing dead zone of a first gate of a first discharge valve mounted on a first casing of a turbomachine to be investigated, the first casing delimiting in its inside a primary gas flow of the turbomachine, the first gate being designed to be able to be moved angularly by the first actuator, depending on a first control signal of the first actuator between one and the other of:
- a first opening position of a first orifice of the first casing to discharge through this first orifice a portion of the first primary flow into a first secondary gas flow located outside the first casing,
- and a first closing position of the first orifice configured to prevent the primary flow from passing through the first orifice, the first gate being provided with a first gas seal gasket able to be compressed against a first edge of the first orifice in the first closing position to seal the closure of the first orifice, characterized in that the estimation device comprises
a measurement means for measuring, for the turbomachine to be investigated operating in flight, the first actual position of the first actuator when the first control signal is equal to a first set point closing signal of the first gate,
a control calculator of the turbomachine to be investigated, configured to:
- determine, based on the first actual position, a measured droop angle of the first gate with respect to the first casing,
- determine, for the turbomachine to be investigated operating in flight, from the measured droop angle, a measured closing dead zone of the first gate, in which the first gasket remains compressed and thus seals the closure of the first orifice,
- record the measured closing dead zone in a permanent memory of the control calculator of the turbomachine to be investigated,
- generate, by the calculator, the first control signal of the first actuator depending on the measured closing dead zone recorded in the memory.

According to one embodiment of the invention, the control calculator of the turbomachine to be investigated is configured to:
calculate, for the turbomachine to be investigated operating in flight, from the measured droop angle, a measured closing dead zone of the first gate, in which the first gasket remains compressed and thus seals the closure of the first orifice.

According to one embodiment of the invention, the first actuator comprises a first actuator body fixed with respect to the first casing, and a first shaft movable in translation with respect to the first actuator body between a first long abutment, which corresponds to a maximum output travel of the first shaft out of the first body, and a first short abutment, which corresponds to a minimum output travel of the first shaft out of the first body, at least one first connection member being mounted between the first shaft and the first gate to move angularly the first gate by movement in translation of the first shaft with respect to the first actuator body, the first closing position corresponding to a first intermediate output travel of the first shaft located below the first long abutment and beyond the first short abutment, the control signal corresponds to a set point length of the first shaft, which is taken with respect to the first actuator body, which is oriented from the first short abutment to the first long abutment and which grows in a first opening direction of the first gate, the calculator being configured to calculate the set point length so as to add the measured closing dead zone to the first angle of the first gate with respect to the first casing.

According to one embodiment of the invention, the calculator is configured to calculate the measured closing dead zone as being equal to a reference dead zone which was predetermined on a reference turbomachine which can operate in flight and on the ground, to which has been added the measured droop angle and from which has been subtracted a reference droop angle which was predetermined on the reference turbomachine operating in flight to propel an aircraft.

According to one embodiment of the invention, the estimation device comprises a measurement means for determining, for the second turbomachine operating on the ground, the reference dead zone which is a second closing angular range of the second gate, during which, between the second closing position and the second opening position, the second gasket remains compressed and thus seals the closure of the second orifice.

According to one embodiment of the invention, the estimation device comprises on-board measurement sensors of the turbomachine to be investigated for determining, for the turbomachine to be investigated operating in flight, a first rotation speed of a first high-pressure compressor of the turbomachine to be investigated, and measured operating parameters comprising at least one quantity selected from among a first atmospheric pressure and a first altitude, the calculator being configured to determine, based on a model of the reference turbomachine giving a second gate angle of the reference turbomachine with respect to the second casing of the reference turbomachine depending on a second rotation speed of the second high-pressure compressor of the reference turbomachine and on a second atmospheric pressure of the reference turbomachine or on a second operating altitude of the reference turbomachine, the reference droop angle, which is the second gate angle of the reference turbomachine, which corresponds according to the model to the measured operating parameters, the device comprising a measurement means for measuring, for the reference turbomachine operating in flight, a second actual position of the second actuator, when the second control signal is equal to a second set point closing signal of the second gate, the calculator being configured to determine the second gate angle corresponding to the angle of the second gate with respect to the second casing, based on the second actual position of the second actuator, which was measured.

Figure 2:
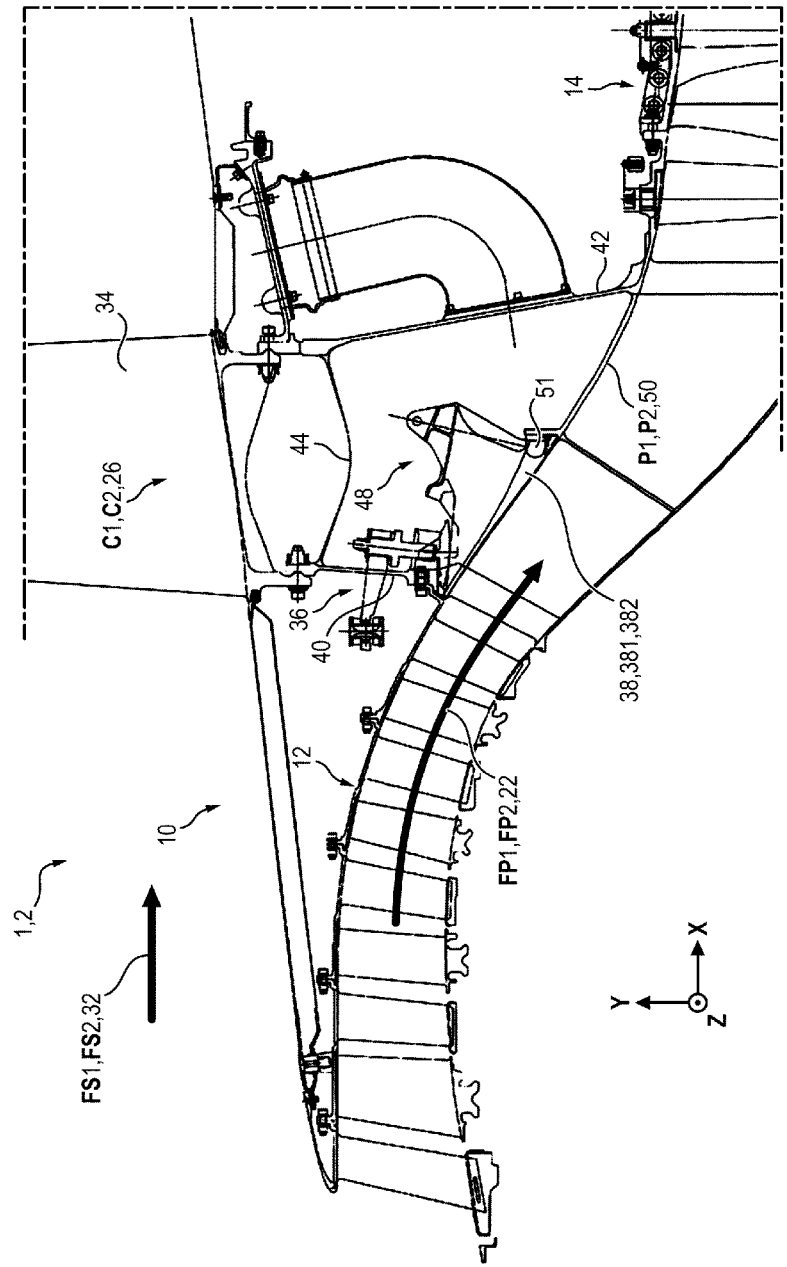
Figure 3:
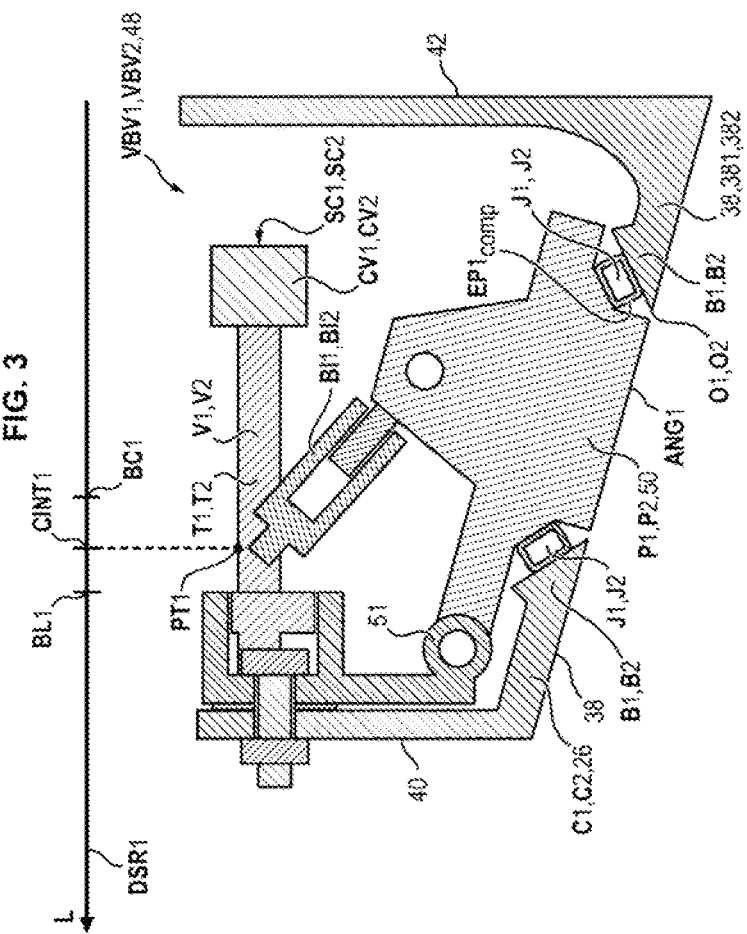
Figure 4:
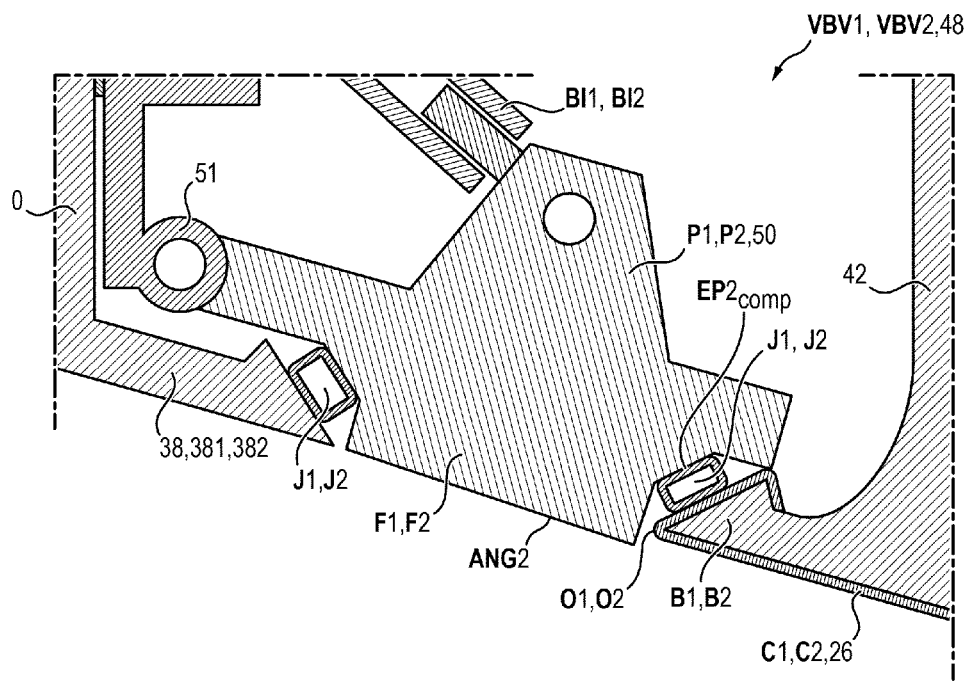
Figure 5:
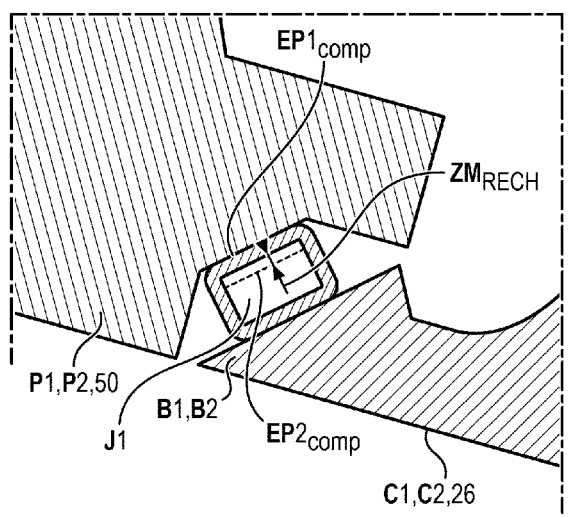
Figure 7:
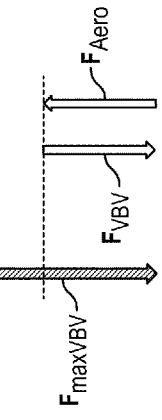
Figure 6:
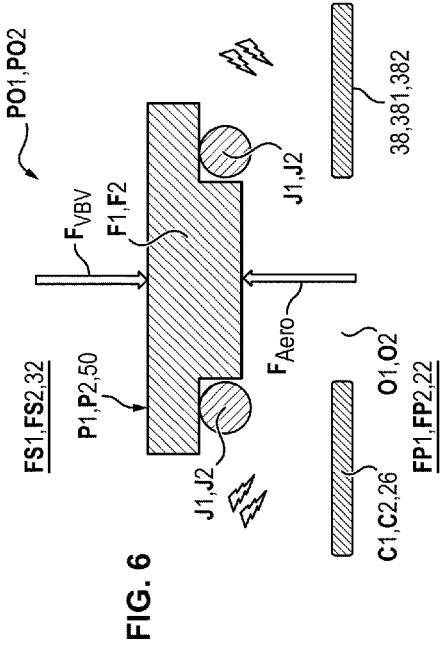
Figure 9:
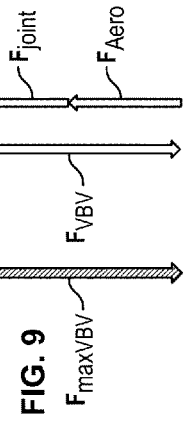
Figure 8:
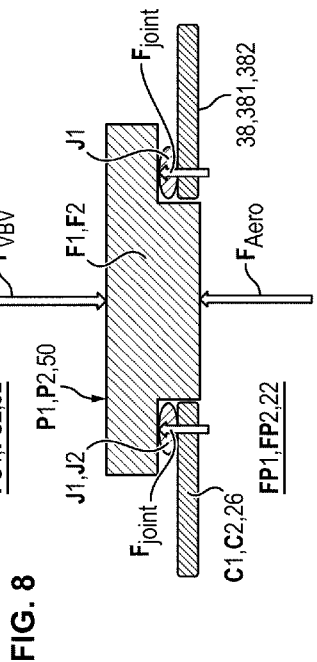
Figures 10, 11, 12:
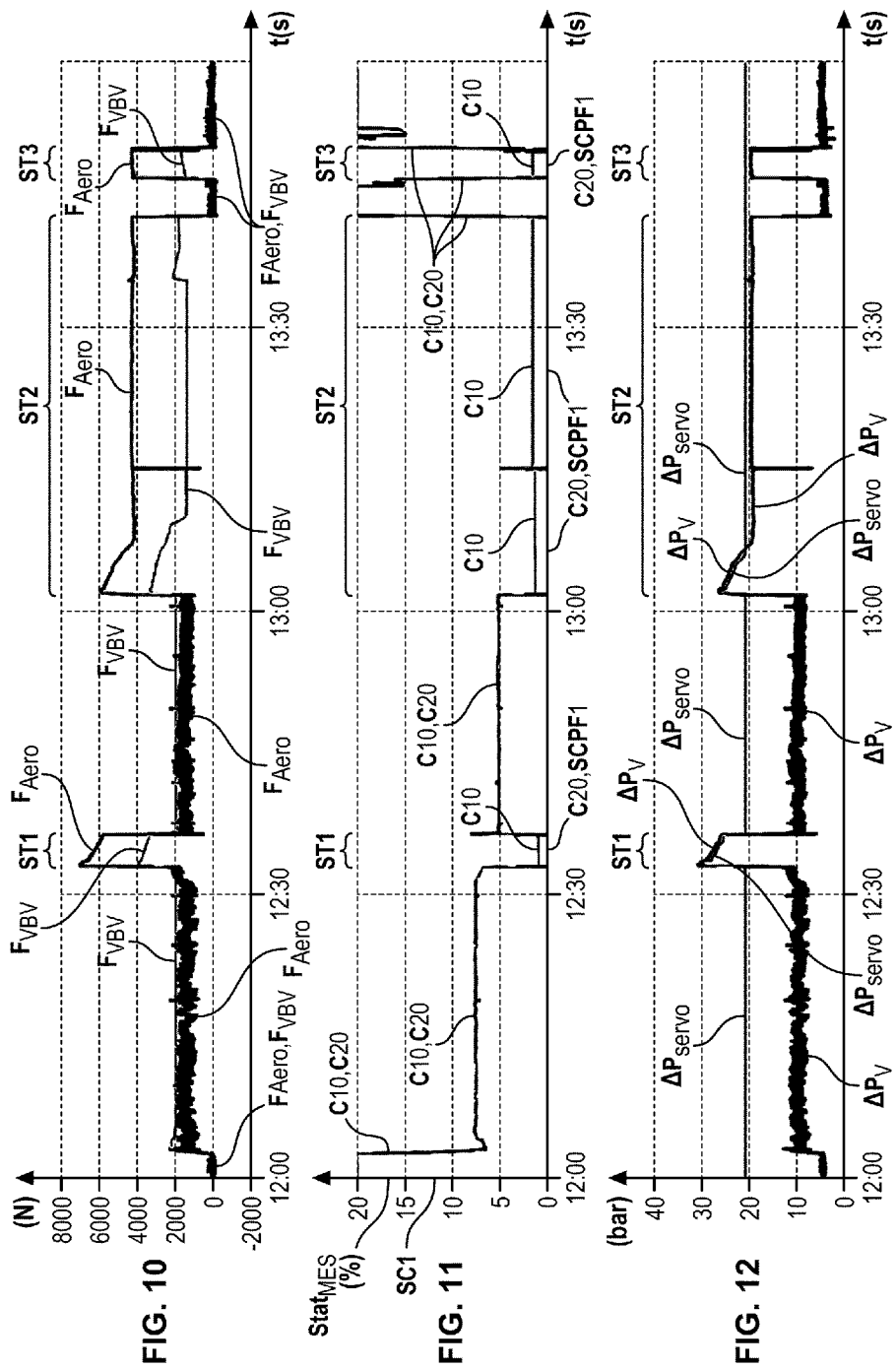
Figure 15:
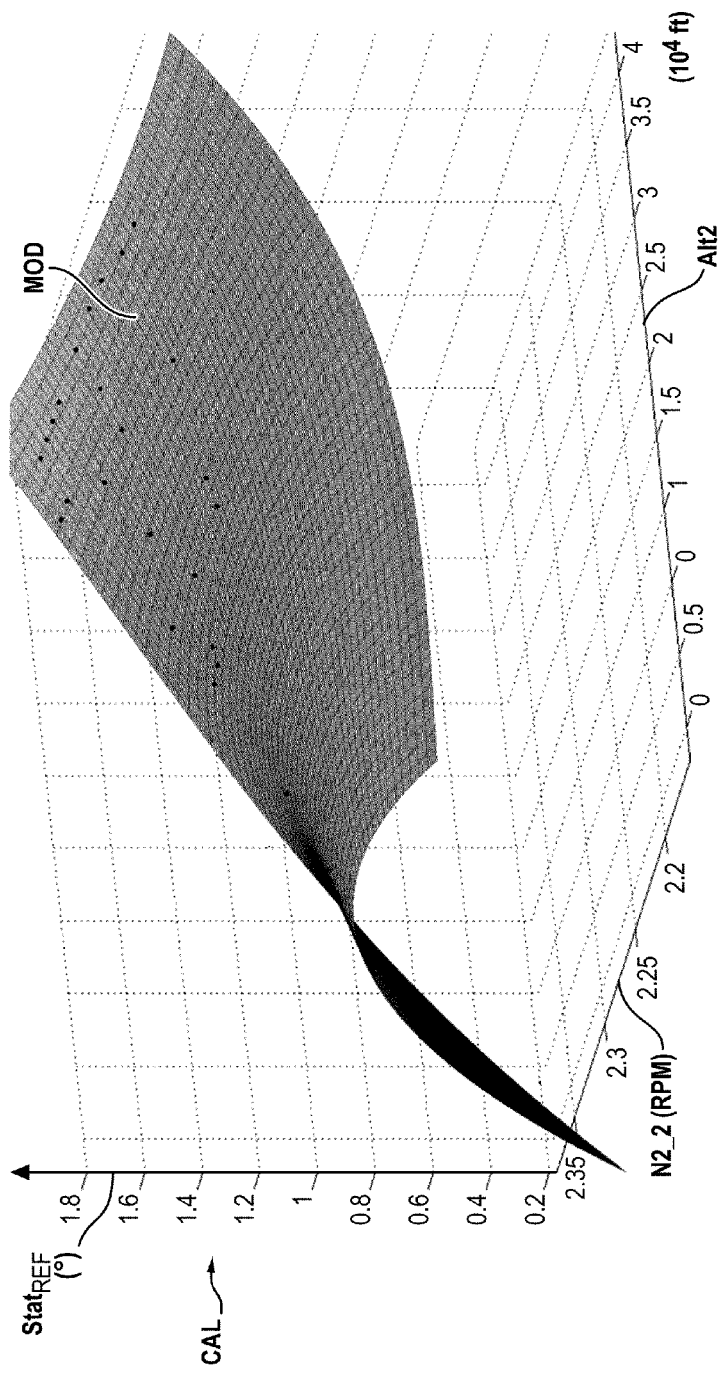
Figure 17:
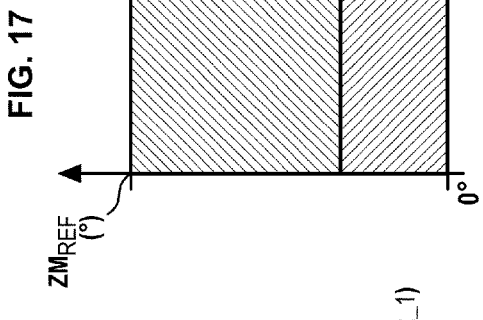
Figure 16:
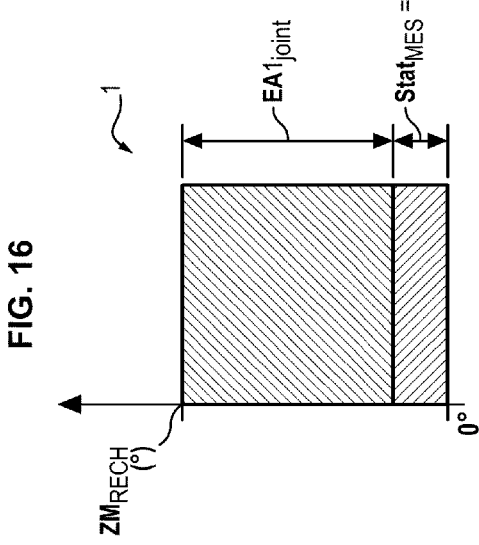
Figure 18:
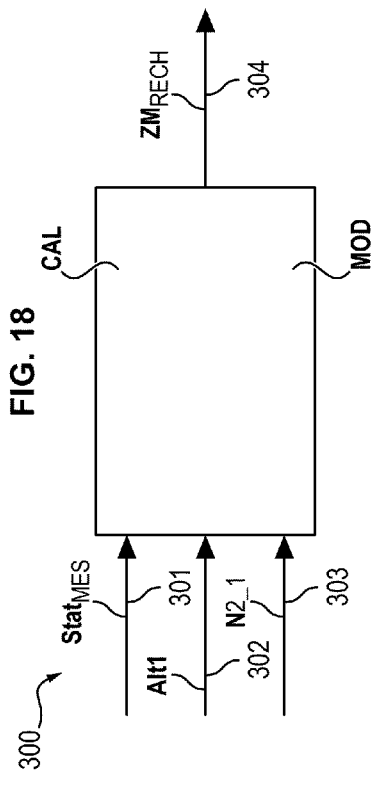
Figure 19:
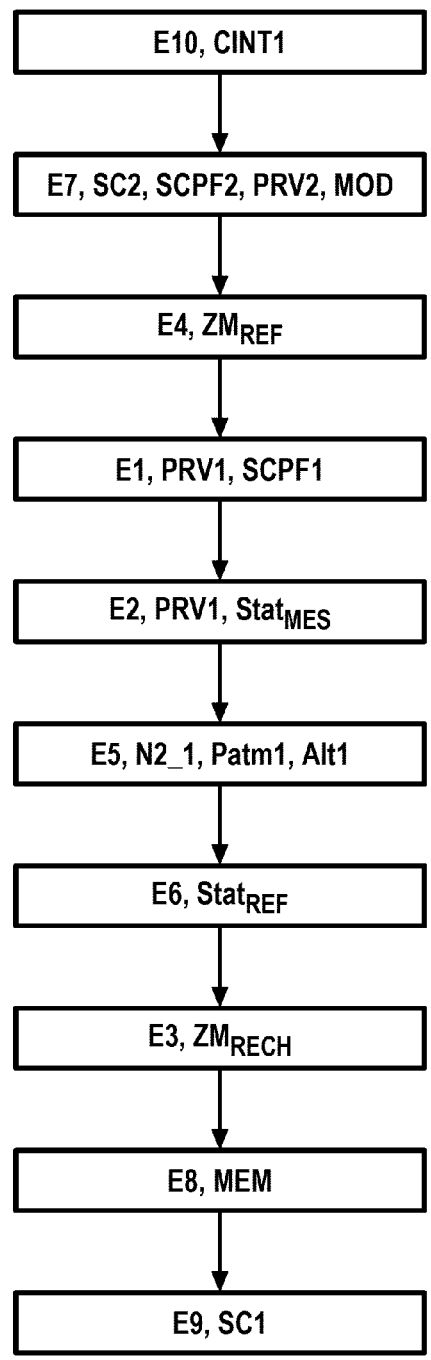

The invention will be better understood upon reading the description that follows, given solely by way of a non-limiting example with reference to the appended drawings, in which:

FIG. 1 shows schematically in longitudinal section an example of a turbomachine to which the estimation device and method according to the invention can apply, FIG. 2 shows schematically in longitudinal section an enlarged view in the closing position of a gate of an intermediate casing of the turbomachine of FIG. 1, to which the estimation device and method according to the invention can apply, FIG. 3 shows schematically in longitudinal section an enlarged view in the closing position of a gate of an intermediate casing of the turbomachine of FIG. 1, to which the estimation device and method according to the invention can apply, FIG. 4 shows schematically in longitudinal section an enlarged view in the closing position of a gate of an intermediate casing of the turbomachine of FIG. 1, to which the estimation device and method according to the invention can apply, FIG. 5 shows schematically in longitudinal section an enlarged view in the closing position of a gate of an intermediate casing of the turbomachine of FIG. 1, to which the estimation device and method according to the invention can apply, FIG. 6 shows schematically in longitudinal section an enlarged view in the opening position of a gate of an intermediate casing of the turbomachine of FIG. 1, to which the estimation device and method according to the invention can apply, FIG. 7 shows schematically forces appearing on the gate of the intermediate casing of FIG. 6, FIG. 6 shows schematically in longitudinal section an enlarged view in the closing position of a gate of an intermediate casing of the turbomachine of FIG. 1, to which the estimation device and method according to the invention can apply, FIG. 9 shows schematically forces appearing on the gate of the intermediate casing of FIG. 8, FIG. 10 is a diagram showing respectively forces which can appear during control of the gate of the turbomachine according to FIGS. 1 to 5, FIG. 11 is a diagram showing respectively gate angles which can appear during control of the gate of the turbomachine according to FIGS. 1 to 5, FIG. 12 is a diagram showing pressure differences which can appear during control of the gate of the turbomachine according to FIGS. 1 to 5, FIG. 13 shows schematically in longitudinal section an enlarged view in the closing position of a gate of an intermediate casing of the turbomachine of FIG. 1, to which the estimation device and method according to the invention can apply, FIG. 14 shows schematically forces appearing on the gate of the intermediate casing of FIG. 13, FIG. 15 shows schematically a mapping of a reference dead zone, which can be used by the estimation device and method according to the invention, FIGS. 16 and 17 show schematically the composition of the dead zone of the first and second turbomachines, FIG. 18 is a modular synopsis of an example of a dead zone estimator implementing the estimation device and method according to the invention, FIG. 19 is an example of a flowchart of the estimation method according to the invention.

Figure 20:
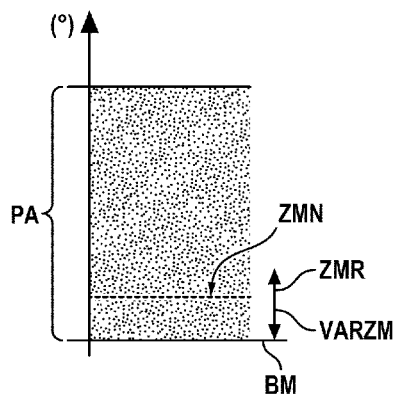
Figure 21:
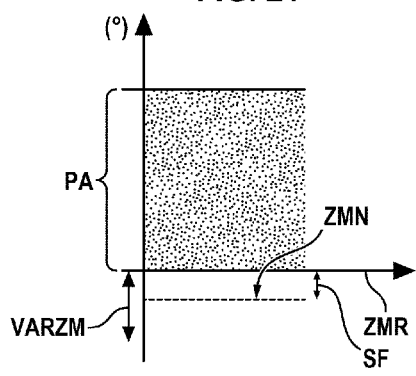
Figure 22:
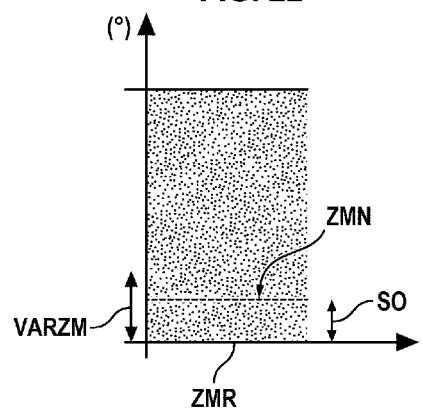
Figure 23:
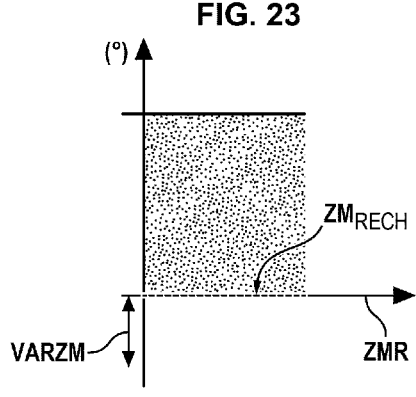

FIG. 20 shows schematically an example of a digitized dead zone and of an actual dead zone according to the prior art, FIG. 21 shows schematically an example of a digitized dead zone and of an actual dead zone according to the prior art, FIG. 22 shows schematically an example of a digitized dead zone and of an actual dead zone according to the prior art, FIG. 23 shows schematically an example of a digitized dead zone and of an actual dead zone, obtained by the estimation and use device according to the invention.

Figure 24:
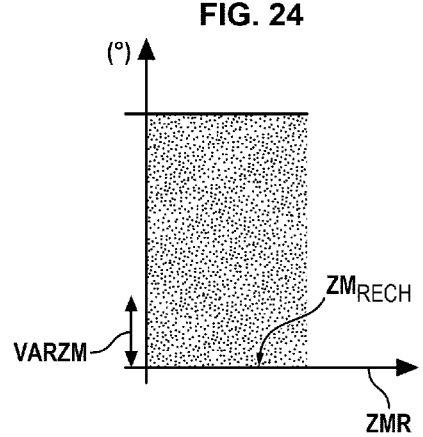

FIG. 24 shows schematically an example of a digitized dead zone and of an actual dead zone, obtained by the estimation and use device according to the invention.

An example of a double flow turbomachine is shown in FIGS. 1 and 2. The turbomachine 10, 1, 2 is intended to be installed on an aircraft, not shown, to propel it in the air. The turbomachine 10 or gas turbine engine assembly has a longitudinal axis 24. The direction extending from the interior to the exterior is the radial direction starting from the longitudinal axis 24. The turbomachine 10 is for example of the two-body type. The turbomachine 10 comprises a fan assembly 28 and an assembly 13 for generating combustion gases and their use, also called a "gas generator". The gas generator 13 comprises, from upstream to downstream in the flow direction of the gases, a low-pressure compressor 12, a high-pressure compressor 14, a combustion chamber 16, a high-pressure turbine 18 and a low-pressure turbine 20 which define a primary gas flow 22. The fan assembly 28 comprises an array of fan blades extending radially outward from a rotor disk 25. The turbomachine 10 has an intake side 29 and an exhaust side 30. The turbomachine 10 also comprises a set of casings which define an inter-stream compartment 36 also called the "core zone", located between a primary flow stream and a secondary flow stream of the double-flow turbomachine. An upstream portion of the inter-stream compartment 36 is formed by a structural casing 26 connected by arms 34 to the internal wall 201 of the duct 30 through the bypass channel 39 of the secondary flow 32. This structural casing 26 is for example an intermediate casing, and will be so designated in the description of the exemplary embodiment that follows, but other types of structural casings are possible, for example an inter-compressor casing interposed between the low-pressure compressor 12 and the high-pressure compressor 14.

In operation, the air flows through the fan assembly 12 and a first portion 22 (primary flow 22) of the air flow is routed through the high-pressure compressor 14, in which the air flow is compressed and sent to the combustion chamber 16. The hot combustion products (not shown in the figures) originating in the combustion chamber 16 are used to drive the turbines 13 and 20, and the low-pressure turbine 20 is connected to the fan assembly 28 to produce the major part of the thrust of the turbomachine 10. The turbomachine 10 also comprises a bypass channel 39 which is used to pass a second portion 32 (secondary flow 32) of the air flow vented from the fan assembly 28 around the central gas turbine engine 13. More precisely, the bypass channel 39 extends between an internal wall 201 of a fan duct 30 or nacelle 30 and an external envelope 202 of the inter-stream compartment 36, also called IFD for "inner fan duct."

In FIGS. 2 to 5, the intermediate casing 26 comprises an internal wall 38 delimiting on the inside the flow space of the primary flow 22, an upstream flange 40 and a downstream flange 42 connected to the exterior surface of the internal wall 38, and an external wall 44 connecting, on the outside, the upstream flange 40 and the downstream flange 42. The arms 34 are fastened to the outer ends of the upstream flange 40 and of the downstream flange 42. The intermediate casing 26 is equipped with a discharge valve 48, or with several discharge valves 48.

A first turbomachine 1 is considered, called the turbomachine to be investigated, similar to the turbomachine 10 as described above, for which a closing dead zone $ZM_{RECH}$ will be determined. The following reference symbols, ending with 1, designate the portions and variables of this first turbomachine 1, introduced by the adjective "first," of which those mentioned above in FIGS. 1 to 5 are recalled.

In the first turbomachine 1, each first discharge valve VBV1, 48 comprises a first gate 50, P1 mounted on the first intermediate casing 26, C1. The first casing 26, C1, delimits on the inside the first primary gas flow 22, FP1. The first gate 50, P1 is mounted pivoting on a hinge 51 and is connected to a first actuator V1 designed to be able to angularly move the first gate 50, P1 depending on a first control signal SC1 of the first actuator V1. The first internal wall 38, 381 of the first intermediate casing 26, C1 comprises a first orifice O1 with a shape corresponding to the first gate 50, P1. A certain number. N of first gates 50, P1 can be provided on the first intermediate casing 26, C1, actuated by a certain number M of first actuators, with for example M<N. For example, the first actuator(s) V1 actuate one or some first gate(s) 50, P1, said to be driving, and all the first gates 50, P1 are connected via a ring which allows having uniform actuation of the first gates 50, P1. The need for discharging the first low-pressure compressor 12, CBP1 is manifested in protection laws. These laws being a representation of an actual discharge flow rate depending on the configuration and the condition of the engine, they must take into account the effective cross section of the first gate and therefore of the dead zone which affects this flow rate.

The first actuator V1 comprises a first actuator body CV1 fixed with respect to the first intermediate casing 26, C1 and a first shaft T1 movable in translation with respect to the first actuator body CV1. At least one first connection member BI1, comprising for example a connecting rod BI1 and articulation devices, is mounted between the first shaft T1 and the first gate P1 to move angularly the first gate P1 by movement in translation of the first shaft T1 with respect to the first actuator body CV1. The first actuator V1 can be a hydraulic actuator, the movement in translation of the movable shaft T1 of which is controlled by the difference in oil pressure on either side of a piston sliding in the body CV1.

The first gate 50, P1 comprises, in FIGS. 6 and 7, a first opening position PO1 of the first orifice O1, where the first gasket J1 is at a distance from the first edge B1, to discharge through this first orifice O1 a portion of the first primary flow FP1, 22 into the first secondary gas flow FS1, 32 located outside the first intermediate casing 26, C1.

The first gate 50, P1 comprises, in FIGS. 8 and 9, a first closing position PF1 of the first orifice O1 so as not to allow the first primary flow FP1, 22 to pass through the first orifice O1 into the first secondary flow FS1, 32. The first actuator V1 allows moving the first gate 50, P1 from the first opening position PO1 to the first closing position PF1 in a closing direction, and from the first closing position PF1 to the first opening position PO1 in an opening direction.

The first gate 50, P1 is provided with a first gas seal gasket J1, able to be compressed against a first edge B1 of the first orifice O1 in the first closing position FP1 so as not to let the first primary flow FP1 pass through the first orifice O1 into the first secondary flow FS1.

In FIGS. 3, 4, 5, 6, 8 and 13, each first gate 50, P1 comprises a first gate casting F1 against which is fastened the first gasket J1.

In FIGS. 6 and 7, when the first gate 50, P1 is in the first opening position PO1, the force $F_{VBV}$ in the first actuator V1 balances the aerodynamic force $F_{Aero}$.

In FIGS. 8 and 9, when the first gate 50, E1 is in the first closing position PF1, the first gasket J1 is compressed against the first edge B1 of the first intermediate casing 26, CA so as to ensure the sealing of the first gate 50, P1 and to provide a smoother primary stream in the flow space of the primary flow 22, i.e. that the first gate 50, P1 is aligned with the first internal wall 38, 381. The force $F_{VBV}$ in the first actuator V1 then balances the aerodynamic force $F_{Aero}$, which depends on the operating point and the forces $F_{joint}$ compressing the gasket, which depend on the angular position of the first gate 50, P1 and therefore on the depression of the first gate 50, P1 in the primary stream.

In the first closing position PF1, the first gate 50, P1 can occupy, with respect to the first casing 26, C1, C2 several different angles located in a certain angular range, called the measured closing dead zone $ZM_{RECH}$, which is due to the flexibility of the first gasket J1 and during which the first gasket J1 does not allow the first primary flow FP1 to pass through the first orifice O1 into the first secondary flow FS1 (effective cross section is zero in this case for the first gate 50, P1). For example, in FIGS. 3 and 5, the first gate 50, P1 can occupy in the first closing position PF1 a certain angle ANG1 with respect to the first casing 26, C1, C2, which makes the first gasket J1 assume a certain compression thickness $EP1_{comp}$ against the first edge B1, where the first gasket J1 does not allow the first primary flow FP1 to pass through the first orifice O1 into the first secondary flow FS1. In FIGS. 4 and 5, the first gate 50, P1 can occupy in the first closing position PF1 another angle ANG2 more depressed into the primary stream than with the angle ANG1, which causes the first gasket J1 to assume a compression thickness $EP2_{comp}$ against the first edge B1, which is smaller than the compression thickness $EP1_{comp}$ and where the first gasket J1 does not allow the first primary flow FP1 to pass through the first orifice O1 into the first secondary flow FS1. The angular range of the first gate 50, P1 corresponding to the difference between the compression thickness $EP1_{comp}$ and the compression thickness $EP2_{comp}$ is comprised in the measured closing dead zone $ZM_{RECH}$.

In the prior art, as illustrated in FIG. 20, the vertical axis of which indicates the angular operating range PA of the first gate 50, P1 in degrees, the digitized dead zone ZMN fixed in the control calculator CAL of the first gate 50, P1 leads to having a gap between the digitized dead zone ZMN and the actual dead zone ZMR which can vary in a certain angular variability range VARZM above a mechanical abutment BM.

This gap is manifested in FIG. 21, the vertical axis of which indicates the angular operating range PA of the first gate 50, P1 in degrees, by excessive closing SF of the first gate 50, P1 to compensate the angular variability range VARZM, due to the fact that the actual dead zone ZMR is above the digitized dead zone ZMN.

This gap is manifested in FIG. 22, the vertical axis of which indicates the angular operating range PA of the first gate 50, P1 in degrees, by excessive opening SO of the first gate 50, P1, to compensate the angular variability range VARZM, due to the fact that the actual dead zone ZMR is below the digitized dead zone ZMN.

According to the invention, during a measurement step E1, the first actual position PRV1 of the first actuator V1 is measured for the first turbomachine 1 (to be investigated) operating in flight when the first control signal SC1 is equal to a first set point closing signal SCPF1 of the first gate P1, for example by a position sensor of the first actuator V1 or by other measurement means. For example, the first actual position PRV1 in translation of the first shaft T1 of the first actuator V1 is measured with respect to the first actuator body CV1.

During a determination step E2 subsequent to the measurement step E1, a first angle $Stat_{MES}$ of the first gate P1 with respect to the first casing C1, called the measured droop angle $Stat_{MES}$, is determined based on the first actual position PRV1, for example by a calculator CAL or by other measurement means.

During a determination step E3 subsequent to the determination step E2, the first closing angular range $ZM_{RECH}$ of the first gate P1, called the measured closing dead zone $ZM_{RECH}$, which corresponds to the fact that the first gasket J1 is compressed so as not to allow the first primary flux FP1 to pass through the first orifice O1 into the first secondary flow FS1, is determined by the calculator CAL, based on the measured droop angle $Stat_{MES}$, for the first turbomachine 1 operating in flight.

During a recording step E8 subsequent to the determination step E3, the measured closing dead zone $ZM_{RECH}$ is recorded in a permanent memory MEM of a calculator CAL serving to control the first turbomachine 1.

During operation in flight of the first turbomachine 1 (to be investigated), the first control signal SC1 of the first actuator V1 is generated, during a control step E9 subsequent to the recording step E8, by the calculator CAL, depending on the measured closing dead zone $ZM_{RECH}$ which was recorded in the memory MEM.

Thanks to the invention, the variability of the dead zone is dispensed with in controlling the angular position of the first gate 50, P1.

Thus, in FIGS. 23 and 24, the vertical axis of which indicates the angular operating range PA of the first gate 50, P1 in degrees, the invention allows identifying the actual dead zone ZMR of each engine to apply most exactly the control laws of the first discharge valve 48, VBV1 by eliminating the uncertainty band linked to the dead zone angular variability range VARZM. FIG. 23 shows that the dead zone identified, i.e. the measured closing dead zone $ZM_{RECH}$, is equal to the actual dead zone ZMR, in the case where this actual dead zone ZMR is located above the dead zone angular variability range VARZM. FIG. 25 shows that the identified dead zone, i.e. the measured closing dead zone $ZM_{RECH}$, is equal to the actual dead zone ZMR, in the case where this actual dead zone ZMR is located below the dead zone angular variability range VARZM.

According to one embodiment, a second turbomachine 2 is also considered, called the reference turbomachine, which is similar to the turbomachine 10 as described above and for which the reference dead zone $ZM_{REF}$ has been determined. The following reference symbols, ending in 2, designate the portions and variables of this second turbomachine 2, introduced by the adjective "second," of which those mentioned above in FIGS. 1 to 5 are recalled. Of course, what is written for the first turbomachine 1 is also valid for the second turbomachine 2.

According to one embodiment, the first shaft T1 is movable in translation with respect to the first actuator body CV1 between a first long abutment BL1, which corresponds to a maximum output travel of the first shaft T1 out of the first body CV1 and a first short abutment BC1, which corresponds to a minimum output travel of the first shaft T1 out of the first body CV1. The first closing position PF1 corresponds to a first intermediate output travel CINT1 of the first shaft T1 out of the first actuator body CV, this first intermediate travel CINT1 being located below the first long abutment BL1 and beyond the first short abutment BC1. In FIG. 3, the abutments BL1 and BC1 and the first intermediate travel CINT1 are taken for a fixed reference point PT1 on the first shaft T1. The output travel of the first shaft T1 out of the first actuator body CV1 corresponds for example to the translation position of the reference point PT1 of the first shaft T1 along an output and input direction DSR1 of the first shaft T1 in the first actuator body CV1, as illustrated in FIG. 3.

According to one embodiment, the first intermediate travel CINT1 of the first shaft T1 is adjusted during an adjustment step E10 prior to the measurement step E1 of the first actual position PRV1 of the first actuator V1, and for example prior to the step E7 or the step E4.

According to one embodiment, the control signal SC1 corresponds to a set point length L of the first shaft T1 out of the first actuator body CV1, which is oriented from the first short abutment BC1 to the first long abutment BL1 and which grows in a first opening direction of the first gate P1.

During the control step E9, the set point length L is calculated by the calculator CAL so as to add the measured closing dead zone $ZM_{RECH}$ to the first angle $Stat_{MES}$ of the first gate P1 with respect to the first casing 26, C1.

According to one embodiment, the measured closing dead zone $ZM_{RECH}$ is calculated by the calculator during step E3 based on the reference dead zone $ZM_{REF}$ which was determined on the reference turbomachine 2 operating on the ground, by correcting it by the difference between the measured droop (or statism or offset) $Stat_{MES}$ of the first gate P1 of the first turbomachine 1 operating in flight and the reference droop angle $Stat_{REF}$ which was determined on the second turbomachine 2 operating in flight.

According to one embodiment, the measured closing dead zone $ZM_{RECH}$ of the first turbomachine 1 is equal to the reference dead zone $ZM_{REF}$, which was predetermined on the second turbomachine 2, called the reference turbomachine, operating on the ground, to which has been added the measured droop angle $Stat_{MES}$ and from which has been subtracted a reference droop angle $Stat_{REF}$ which was predetermined on the second turbomachine 2 operating in flight, according to the following equation:

$$ZM_{RECH}=ZM_{REF}+Stat_{MES}-Stat_{REF}$$

Thanks to this embodiment, tests for measuring the dead zone in operation of each first turbomachine 1 in flight is avoided, this measured closing dead zone $ZM_{RECH}$ of the first turbomachine 1 depending on the operating point of the first turbomachine 1 and on the altitude.

The droop of the discharge valve VBV1, 48 is a phenomenon encountered on many engines, primarily at altitude. It is manifested by an incapacity to close entirely the first gate 50, P1, where, although the first control signal SC1 is equal to a first set point closing signal SCPF1 of the first gate P1, the measured droop angle $Stat_{MES}$ is not at its set point closing position at 0° but at a different value which could reach 1.5°, as shown by way of an example by the 3 periods ST1, ST2 and ST3 of droop in FIGS. 10, 11 and 12. Droop is a continuous phenomenon and can assume different values between 0° and 3° for example.

In FIG. 11, the measured droop angle $Stat_{MES}$ in degrees in the ordinate varies according to the curve C10, while the first control signal SC1 in degrees on the ordinate varies according to the curve C20, as a function of time t in seconds (s) in the abscissa. FIG. 10 shows, in a manner corresponding to FIG. 11, the force $F_{VBV}$ in the first actuator V1 in Newtons (N) in the ordinate and the aerodynamic force $F_{Aero}$ in Newtons (N) in the ordinate, as a function of time t in seconds (s) in the abscissa. FIG. 12 shows, in a manner corresponding to FIG. 11, the pressure difference $\Delta P_{servo}$ at the terminals of the first servo-valve 48, VBV1 and the pressure difference $\Delta P_v$ at the terminals of the first actuator V1 in bars in the ordinate, as a function of time t in seconds (s) in the abscissa. During these droop periods ST1, ST2 and ST3, the force $F_{VBV}$ becomes less than the aerodynamic force $F_{Aero}$ and the pressure difference $\Delta P_v$ at the terminals of the first actuator V1 becomes equal to the pressure difference $\Delta P_{servo}$ at the terminals of the first servovalve 48, VBV1, which indicates that the entire hydraulic power of the first actuator is consumed and does not allow complete closing of the first gate 50, P1.

This phenomenon is explained by the fact that the compression of the first gasket J1 requires a greater and greater force as the first gate 50, P1 is depressed farther into the primary stream in the first closing position PF1. Thus, when the hydraulic power available is no longer sufficient (the effect of altitude in particular), the necessary force for the complete closure of the first gate 50, P1 cannot be supplied, as shown in FIGS. 13 and 14, and the first gasket J1 is not completely compressed while not letting pass, in the first closing position PF1 the first primary flow FP, 22 through the first orifice O1 into the first secondary flow FS1, 32, even when the force $F_{VBV}$ in the first actuator V1 is equal to the maximum force $Fmax_{VBV}$. The primary stream is then not smooth, i.e. in the first closing position PF1 the first gate 50, P1 is not aligned with the first internal wall 38, 381 and is slightly lifted by the first primary flow 22, FP1 toward the first secondary flow 32, FS1.

According to one embodiment, for the second turbomachine 2 serving as a reference, during a determination step E4 prior to the determination step E3 and for example prior to the measurement step E1, the reference dead zone $ZM_{REF}$, which is a second closing angular range $ZM_{REF}$ of its second gate 50, P2 during which, between its second closing position PF2 and its second opening position PO2 its second gasket J2 is compressed so as not to allow its second primary flow FP2 to pass through its second orifice O2 into its second secondary flow FS2, is determined for the second turbomachine 2 operating on the ground, by measurement means, for example on a test bench on the ground. Of course, the reference dead zone $ZM_{REF}$ can be determined in another manner than according to this embodiment.

According to one embodiment, during a determination step E5 prior to the determination step E3, a first rotation speed $N2\_1$ of the first high-pressure compressor 14, CHP1 of the first turbomachine 1, and a first atmospheric pressure Patm1 or a first altitude Alt1, called measured operating parameters $N2\_1$, Patm1 or Alt1, are determined for the first turbomachine 1 operating in flight, for example by on-board measurement sensors on the first turbomachine 1 and/or on the aircraft comprising it.

According to one embodiment, the calculator CAL comprises a model MOD of the second turbomachine 2 operating in flight, giving the second gate angle $Stat_{REF}$ of the second turbomachine 2 with respect to its second intermediate casing 26, C2, as a function of a second rotation speed $N2\_2$ of its second high-pressure compressor 14, CHP2 and of a second atmospheric pressure Patm2 of the second turbomachine 2 or of a second operating altitude Alt2 of the second turbomachine 2.

This is illustrated by way of an example in FIG. 1, where the second angle $Stat_{REF}$ is in degrees in vertical ordinate, the second rotation speed $N2\_2$ is on a first horizontal axis in revolutions per minute (rpm) in the abscissa and the second altitude Alt2 is on a second horizontal axis in feet (ft) times $10^4$ in the abscissa, perpendicular to the first horizontal axis. FIG. 17 illustrates the situation of the second turbomachine 2, where in the ordinate the reference dead zone $ZM_{REF}$ is equal to the sum of the reference droop angle Stat$_{REF}$=f(Alt2, N2_2) of the model. MOD and of a second angular gap EA2$_{joint}$ corresponding to the compression of the second gasket J2.

FIG. 16 illustrates the situation of the first turbomachine 1, where in the ordinate the measured closing dead zone ZM$_{RECH}$ is equal to the sum of the measured droop angle Stat$_{MES}$=f(Alt1, N2_1) determined based on the model MOD and of a second angular gap EA1$_{joint}$ corresponding to the compression of the first gasket J1.

Of course, in the model MOD, the variable "second operating altitude Alt2 of the second turbomachine 2" can be transformed into the variable "second operating pressure Patm2 of the second turbomachine 2" and conversely, given that there exists a bijective relation between them, as is known to a person skilled in the art.

According to one embodiment, during a determination step E6 prior to the determination step E3 and subsequent to the determination step E5, the reference droop angle Stat$_{REF}$, which is the second gate angle Stat$_{REF}$ of the second gate 50, P2 of the second turbomachine 2, which corresponds according to the model MOD to the measured operating parameters N2_1, Patm1 or Alt1, i.e. for N2_2=N2_1 and Patm2=Patm1 or Alt2=Alt1, is determined by the calculator CAL, based on the model MOD of the second turbomachine 2 operating in flight.

According to one embodiment, the second gate angle Stat$_{REF}$ of the model MOD corresponds to an angle Stat$_{REF}$ of the second gate 50, P2 with respect to the second casing 26, C2 and has been determined for example by a calculator or by other measurement means during a determination step E7 prior to the determination step E6 and for example prior to the measurement step E1, based on a second actual position PRV2 of the second actuator V2, which for its part was measured for the second turbomachine 2 operating in flight, for example on a test bench in flight by a position sensor of the second actuator V2 or by other measurement means, when its second control signal SC2 is equal to a second set point closing signal SCPF2 of the second gate P2.

The calculator CAL and the measurement means or sensors described above can be part of an estimation device or estimator, implementing the estimation method described above. The calculator CAL operates automatically and can be embodied by a processor or a computer or a server, which are provided with computer processing programs for carrying out the processing described below and permanent memories for recording there the data and the processing carried out. In FIG. 18, an example of an estimator 300 of this type comprises a first input 301 for receiving the measured droop angle Stat$_{MES}$, a second input 302 for receiving the first a altitude Alt1, a third input 303 for receiving the first rotation speed N2_1 and an output. 304 for supplying the measured closing dead zone ZM$_{RECH}$. The inputs 301, 302 and 303 can be in the form of a data introduction interface. The output 304 can be in the form of a data output interface or a display screen. The calculator CAL for the second turbomachine 2 can be separated from the calculator CAL for the first turbomachine 1.

Of course, the reference turbomachine 2 or second turbomachine 2 can be different from that described above.

Of course, the embodiments, features, possibilities and examples above can be combined with one another or be selected independently of one another.

The invention claimed is:

1. An estimation and use method for controlling a first actuator, of a closing dead zone of a first gate of a first discharge valve mounted on a first casing of a turbomachine to be investigated, the first casing delimiting in its inside a first primary gas flow of the turbomachine, the first gate being designed to be able to be moved angularly by the first actuator depending on a first control signal of the first actuator between one and the other of:
 a first opening position of a first orifice of the first casing for discharging through the first orifice a portion of the first primary gas flow into a first secondary gas flow located outside the first casing, and
 a first closing position of the first orifice configured to prevent the first primary gas flow from passing through the first orifice,
 the first gate being provided with a first gas seal gasket, able to be compressed against a first edge of the first orifice in the first closing position to seal closing of the first orifice,
 the estimation and use method comprising:
  measuring, for the turbomachine to be investigated operating in flight, a first actual position of the first actuator when the first control signal is equal to a first set point closing signal of the first gate,
  determining, based on the first actual position, a measured droop angle of the first gate with respect to the first casing,
  calculating by a control calculator of the turbomachine to be investigated, for the turbomachine to be investigated operating in flight, from the measured droop angle, a measured closing dead zone of the first gate, in which the first gas seal gasket remains compressed and thus seals closing of the first orifice,
 the measured closing dead zone being equal to a reference dead zone, which was predetermined during operation on the ground on a reference turbomachine which can operate in flight and on the ground, to which has been added the measured droop angle and from which has been subtracted a reference droop angle which was predetermined on the reference turbomachine operating in flight to propel an aircraft,
  recording the measured closing dead zone in a permanent memory of the control calculator, and
  generating by the control calculator the first control signal of the first actuator depending on the measured closing dead zone recorded in the permanent memory.

2. The estimation and use method according to claim 1, wherein the first actuator comprises a first actuator body fixed with respect to the first casing and a first shaft movable in translation with respect to the first actuator body between a first long abutment, which corresponds to a maximum output travel of the first shaft out of the first actuator body and a first short abutment, which corresponds to a minimum output travel of the first shaft out of the first actuator body,
 at least one first connection member being mounted between the first shaft and the first gate to move angularly the first gate by movement in translation of the first shaft with respect to the first actuator body,
 the first closing position corresponding to a first intermediate output travel of the first shaft located below the first long abutment and beyond the first short abutment.

3. The estimation and use method of claim 2, further comprising adjusting the first intermediate output travel of the first shaft prior to measuring of the first actual position of the first actuator.

4. The estimation and use method of claim 2, wherein the first control signal corresponds to a set point length of the first shaft, which is taken with respect to the first actuator body, which is oriented from the first short abutment to the first long abutment and which grows in a first opening direction of the first gate, and the estimation and use method further comprises calculating by the control calculator the set point length so as to add the measured closing dead zone to the measured drop angle of the first gate with respect to the first casing.

5. The estimation and use method according to claim 1, wherein the reference turbomachine has a second gate of a second discharge valve mounted on a second casing of the reference turbomachine, the second casing delimiting in its inside a second primary gas flow of the reference turbomachine, the second gate being designed to be able to be moved angularly by a second actuator depending on a second control signal of the second actuator between one and the other of:

a second opening position of a second orifice of the second casing to discharge through the second orifice a portion of the second primary gas flow into a second secondary gas flow of the reference turbomachine located outside the second casing, and a second closing position of the second orifice to prevent the second primary gas flow from passing through the second orifice, the second gate being provided with a second gas seal gasket, able to be compressed against a second edge of the second orifice in the second closing position to seal closing of the second orifice.

6. The estimation and use method according to claim 5, further comprising determining for the second turbomachine operating on the ground, the reference dead zone, which is a second closing angular range of the second gate, during which, between the second closing position and the second opening position, the second gas seal gasket remains compressed and thus seals closing of the second orifice.

7. The estimation and use method of claim 5, further comprising:

determining for the turbomachine to be investigated operating in flight, a first rotation speed of a first high-pressure compressor of the turbomachine to be investigated, and measured operating parameters comprising at least one quantity selected from among a first atmospheric pressure and a first altitude, and determining based on a model of the reference turbomachine giving a second gate angle of the reference turbomachine with respect to the second casing of the reference turbomachine, depending on a second rotation speed of a second high-pressure compressor of the reference turbomachine and on a second atmospheric pressure of the reference turbomachine or on a second operating altitude of the reference turbomachine, the reference droop angle, which is the second gate angle of the reference turbomachine which corresponds according to the model to the measured operating parameters, the second gate angle corresponding to an angle of the second gate with respect to the second casing, which has been determined based on a second actual position of the second actuator, having itself been measured for the reference turbomachine operating in flight, when the second control signal is equal to a second set point closing signal of the second gate.

8. An estimation and use device, for controlling a first actuator, of a closing dead zone of a first gate of a first discharge valve mounted on a first casing of a turbomachine to be investigated, the first casing delimiting in its inside a first primary gas flow of the turbomachine, the first gate being designed to be able to be moved angularly by the first actuator, depending on a first control signal of the first actuator between one and the other of:

a first opening position of a first orifice of the first casing to discharge through the first orifice a portion of the first primary gas flow into a first secondary gas flow located outside the first casing, and a first closing position of the first orifice configured to prevent the first primary gas flow from passing through the first orifice, the first gate being provided with a first gas seal gasket able to be compressed against a first edge of the first orifice in the first closing position to seal closing of the first orifice, wherein the estimation and use device comprises:

a first position sensor for measuring, for the turbomachine to be investigated operating in flight, a first actual position of the first actuator when the first control signal is equal to a first set point closing signal of the first gate, and a control calculator of the turbomachine to be investigated, configured to:

determine, based on the first actual position, a measured droop angle of the first gate with respect to the first casing, calculate, for the turbomachine to be investigated operating in flight, from the measured droop angle, a measured closing dead zone of the first gate, in which the first gas seal gasket remains compressed and thus seals closing of the first orifice, the measured closing dead zone being equal to a reference dead zone which was predetermined on a reference turbomachine which can operate in flight and on the ground, to which has been added the measured droop angle and from which has been subtracted a reference droop angle which was predetermined on the reference turbomachine operating in flight to propel an aircraft, record the measured closing dead zone in a permanent memory of the control calculator of the turbomachine to be investigated, and generate the first control signal of the first actuator depending on the measured closing dead zone recorded in the permanent memory.

9. The estimation and use device of claim 8, wherein the first actuator comprises a first actuator body fixed with respect to the first casing, and a first shaft movable in translation with respect to the first actuator body between a first long abutment, which corresponds to a maximum output travel of the first shaft out of the first body- and a first short abutment, which corresponds to a minimum output travel of the first shaft out of the first actuator body, at least one first connection member being mounted between the first shaft and the first gate to move angularly the first gate by movement in translation of the first shaft with respect to the first actuator body, the first closing position corresponding to a first intermediate output travel of the first shaft located below the first long abutment and beyond the first short abutment, wherein the first control signal corresponds to a set point length of the first shaft, which is taken with respect to the first actuator body, which is oriented from the first short abutment to the first long abutment and which grows in a first opening direction of the first gate, and the control calculator being configured to calculate the set point length so as to add the measured closing dead zone to the measured droop angle of the first gate with respect to the first casing.

10. The estimation and use device of claim 8, wherein the reference turbomachine has a second gate of a second discharge valve mounted on a second casing of the reference turbomachine, the second casing delimiting in its inside a second primary gas flow of the reference turbomachine, the second gate being designed to be able to be moved angularly by a second actuator depending on a second control signal of the second actuator between one and the other of:
- a second opening position of a second orifice of the second casing to discharge through the second orifice a portion of the second primary gas flow into a second secondary gas flow of the reference turbomachine located outside the second casing, and
- a second closing position of the second orifice to prevent the second primary gas flow from passing through the second orifice, the second gate being provided with a second gas seal gasket able to be compressed against a second edge of the second orifice in the second closing position to seal closing of the second orifice.

11. The estimation and use device of claim 10, further comprising a measurer for determining, for the second turbomachine operating on the ground, the reference dead zone which is a second closing angular range of the second gate, during which, between the second closing position and the second opening position, the second gas seal gasket remains compressed and thus seals closing of the second orifice.

12. The estimation and use device of claim 10, further comprising on-board measurement sensors of the turbomachine to be investigated for determining, for the turbomachine to be investigated operating in flight, a first rotation speed of a first high-pressure compressor of the turbomachine to be investigated, and measured operating parameters comprising at least one quantity selected from among a first atmospheric pressure and a first altitude,
wherein the control calculator is configured to determine, based on a model of the reference turbomachine giving a second gate angle of the reference turbomachine with respect to the second casing of the reference turbomachine depending on a second rotation speed of a second high-pressure compressor of the reference turbomachine and on a second atmospheric pressure of the reference turbomachine or on a second operating altitude of the reference turbomachine, the reference droop angle, which is the second gate angle of the reference turbomachine, which corresponds according to the model to the measured operating parameters,
the estimation and use device comprises a second position sensor for measuring, for the reference turbomachine operating in flight, a second actual position of the second actuator, when the second control signal is equal to a second set point closing signal of the second gate, and
the control calculator is configured to determine the second gate angle corresponding to an angle of the second gate with respect to the second casing, based on the second actual position of the second actuator.

* * * * *